United States Patent [19]
Strecker et al.

[11] 4,173,557
[45] Nov. 6, 1979

[54] INSULATING SEALANT COMPOSITIONS

[75] Inventors: Lawrence A. Strecker; Vernon W. Wells, Jr., both of St. Louis, Mo.

[73] Assignee: Inmont Corporation, New York, N.Y.

[21] Appl. No.: 951,212

[22] Filed: Oct. 13, 1978

[51] Int. Cl.² ............................................. C08K 5/10
[52] U.S. Cl. ..................... 260/31.8 DR; 252/188.3 R; 260/33.6 A; 260/42.36; 525/194
[58] Field of Search ............ 260/42.36, 890, 31.8 DR, 260/33.6 A; 252/188.3 R

[56] References Cited

U.S. PATENT DOCUMENTS

| | | | |
|---|---|---|---|
| 3,250,733 | 5/1966 | Giller | 260/890 |
| 4,014,852 | 3/1977 | Gessler et al. | 260/42.36 |

*Primary Examiner*—Lewis T. Jacobs
*Attorney, Agent, or Firm*—Michael R. Chipaloski; F. W. Wyman

[57] ABSTRACT

Pumpable, low viscosity, elastomeric, room temperature curable insulating sealant compositions of (1) a blend of 5 to 95 parts of liquid dibrominated polybutadiene elastomer and 95 to 5 parts of liquid, low molecular weight butyl rubber and (2) a curing agent for each of the elastomers. The sealants exhibit superior adhesion to glass, aluminum and steel.

8 Claims, No Drawings

INSULATING SEALANT COMPOSITIONS

BACKGROUND OF THE INVENTION

This invention relates to improvements in sealants used in making insulating windows for the building industry. Such windows are usually referred to as multiple glazed units. They are made by assembling two or more sheets, or panes of glass, spaced apart from one another by spacer elements around the edges which provides dead air space between the sheets of glass. To obtain optimum insulative effect, and to prevent air, water, vapors and dust from seeping into the dead air space, the sheets of glass must be hermetically sealed to each other and to the spacer elements. The spacer elements are usually made of metal. Also the multiple glazed units must be securely attached to a metal or wood frame by suitable sealant material.

One current practice in the insulating glass industry at the present time is to use a two part ambient temperature curing polysulfide sealant to assemble and seal the double or multipane glass units. This present practice is deficient in its ability to prevent the passage of moisture into the sealed unit because of the inherent relatively high moisture vapor transmission (MVT) of the polysulfide sealant. In attempts to overcome the deficiencies of the polysulfide sealant, for instance by incorporating plasticizers and chemical additives, other important properties such as resistance to ultraviolet radiation, adhesion, modulus and resistance to oils and plasticizers present in glazing compounds used in window installation, are adversely affected without improving the MVT of the polysulfide sealant to any appreciable extent.

Another practice in the industry is to use two sealants. An extruded butyl rubber tape sealant is applied as an innerseal to provide a good MVT resistant seal and then an exterior seal of a fast curing two part polysulfide sealant is applied to hold the glass panes in position. Butyl rubber alone is a non-curing sealant with good MVT resistance but it must be supplemented by a polysulfide sealant to provide quick setting to hold the panes together and the butyl rubber sealant, which provides good MVT resistance, can be allowed to set at its leisure. Thus dual sealant technology provides an acceptable product, but is objectionable because it is time consuming and costly.

Sealants based on dibrominated polybutadiene alone as the elastomeric constituent are known but are deficient in insulating glass sealants due to poor water resistance of the cured polymer and limited weather and ultraviolet light resistance. In addition the sealant is slow in attaining a tack-free surface after application.

Sealants based on low molecular weight butyl rubber alone as the elastomeric constituent are known but are deficient as insulating glass sealants because they are extremely slow in developing good tensile strength. They also require high levels of solvent in order to obtain a pumpable sealant. This results in a low solids sealant which when applied in an insulating glass unit results in an undesirable chemical fog between the panes.

SUMMARY OF THE INVENTION

The present invention overcomes the disadvantages of the prior art by providing an improved sealant which has the desirable properties required for a sealant for use in the insulating glass industry. The sealants of the present invention make it possible to use a single fast-curing sealant for making insulating glass units and still obtain excellent MVT resistance and other desirable properties. The sealants of the invention are based on a single pumpable, low viscosity, elastomeric, room temperature curable composition, having good adhesion to glass, aluminum and steel, and providing a moisture barrier seal with good weather properties, said composition comprising (1) a blend of 5 to 95 parts of liquid dibrominated polybutadiene elastomer and 95 to 5 parts of liquid, low molecular weight butyl rubber and (2) a curing agent for each of the elastomers, said sealant compositions having properties making them eminently suitable for use as sealants in the insulating glass industry. This is surprising in view of the fact that neither of these materials when used alone as the elastomeric constituent of a sealant provides all the properties that are acceptable in the insulating glass industry.

DETAILED DESCRIPTION OF THE INVENTION

The present invention is directed to a pumpable, low viscosity, elastomeric, room temperature curable sealant composition, having good adhesion to glass, aluminum and steel, and providing a moisture barrier seal with good weather properties, said composition comprising (1) a blend of 5 to 95 parts of liquid dibrominated polybutadiene elastomer and 95 to 5 parts of liquid, low molecular weight butyl rubber and (2) a curing agent for each of the elastomers.

The sealants of the present invention are faster curing and have faster development of tensile strength than sealants made with either dibrominated polybutadiene or low molecular weight butyl rubber alone. The invention also provides a sealant of high solids but with workable viscosity with no adverse effect on fogging characteristics when applied in an insulating glass unit. All of the desirable attributes have been unattainable in the past in a single sealant composition.

In addition to dibrominated polybutadiene and low molecular weight butyl rubber mentioned hereinabove, the sealants of the present invention contain other ingredients. For instance, polyamine compounds are included as curing or cross-linking agents for the dibrominated polybutadiene and conventional curing agents for the butyl rubber such as a mixture of manganese dioxide as an oxidizing agent and p-quinone dioxime as a non-sulfur cure modifier which is oxidizable to an aromatic dinitroso compound.

Other conventional additives that are used in the sealants of the present invention include: inert fillers, pigments, plasticizers, stabilizers and adhesion promoters. Conventional additives that may be included are polyepoxide resins in minor amounts and volatile solvents in minor amounts.

Liquid dibromopolybutadiene (DBBD) as used herein refers to brominated low-molecular weight polybutadiene elastomer in which the substantially linear polymer molecules are terminated with allylic bromine groups. Such brominated polymers can be made by the method described in U.S. Pat. No. 3,506,742 and have viscosities of 750–2000 poises (Brookfield, at 25 degrees C.) The molecular weights of these DBBD polymers are usually in the range of from about 4,000 to about 14,000 and preferably from about 4,000 to 6,000. For use in the present invention best results have been obtained using DBBD polymers having molecular weights on the order of 4,000 to 6,000 and viscosities of from about 140 to about 4,000 poises and preferably from about 1,000 to 2,000 poises at 25 degrees C. A description of some of the other properties of DBBD polymers may be found in Rubber Age, February 1972, page 37, wherein some details are disclosed of the compounding of DBBD polymers to make sealants. The DBBD polymers are cured, or vulcanized, by reacting with polyfunctional polyamines, especially tertiary amines, such as tetramethyl hexamethylene diamine, hexamethyl triethylene tetramine and octamethyl pentaethylene hexamine. The curing reaction consists of the reaction of the terminal bromine groups of polymer with the amine groups of the curing agent. When the amine group of the curing agent is a tertiary amine, a quaternary linkge is formed. Difunctional curing agents such as tetramethyl hexamethylene diamine, merely act as a chain extender to make a linear, higher molecular weight polymer molecule; more highly functional polyamine curing agents provide three dimensional cross-linked structures in the cured polymer. For the present invention the highly functional curing agents are preferred.

Low molecular weight butyl rubber as used herein refers to elastomeric copolymers of isobutylene and isoprene containing 4.0 to 4.5% by weight of isoprene and having a molecular weight of from about 10,000 to about 45,000, especially from about 35,000 to about 45,000. Such low molecular weight butyl rubbers and their preparation are described in the literature, e.g., U.S. Pat. No. 3,846,370. These liquid elastomers can be cured, or vulcanized, with the conventional rubber vulcanizing systems. The prior art teaches that low molecular weight butyl rubber can be cured at high temperatures with high temperature cure systems, such as a sulfur cure system or it can be cured at room temperature with a two-part cure system. For the purposes of the present invention a non-sulfur curing system is preferred. Such cure systems include (1) a compound that is converted to a nitroso compound by oxidation and (2) an inorganic oxide oxidizing agent. The two compounds are used in the ratios by volume between 1:1 and 20:1. The compound which is convertible to a nitroso compound is referred to as a cure modifier. For purposes of the present invention the preferred cure modifier is a compound that converts to an aromatic dinitroso compound.

Preferably, the sealants of the present invention are prepared by mixing a base composition and an accelerator composition a short time before application of the sealant. The base composition and the accelerator composition are stable indefinitely but when they are mixed they begin to cure at room temperature and will cure completely within about six hours to two weeks depending upon the particular formulation.

Base compositions in accordance with the invention consist of:
(a) 100 parts of a blend consisting of 5 to 95 parts of dibrominated polybutadiene and 95 to 5 parts of low molecular weight butyl rubber,
(b) 0 to 50 parts of an adhesion promoter such as an epichlorohydrin-bisphenol type of epoxy resin, e.g., Epon 1002, Epon 1007 and Epon 828; or a silane, e.g., gammaglycidoxy propyltrimethoxy silane, or preferably a combination of both.
(c) 10 to 200 parts of fillers and pigments, such as calcium carbonate, carbon black, titanium dioxide, iron oxide, silane coated silicas, barium sulfate and zinc sulfides.
(d) 0 to 100 parts of plasticizer such as a dialkyl phthalate and aromatic, naphthenic, and paraffinic hydrocarbon oils (in general the plasticizer is low molecular weight liquid or solid material used to modify the processing and physical properties of the composition).
(e) 2 to 10 parts of a heat stabilizer, e.g., lead phthalate and basic lead carbonate, and
(f) 1 to 5 parts of a non-sulfur cure modifier, i.e., an aromatic compound which is oxidizable to an aromatic dinitroso compound, e.g., p-quinone dioxime.

The accelerator component in accordance with the invention consists of:
(a) 100 parts of polyfunctional amine, e.g., methylated pentaethylene hexamine, triethylene diamine, polyethylene imine. This is a curing agent for the dibrominated polybutadiene,
(b) 10 to 50 parts of a solid inorganic oxide oxidizing agent, e.g., $M_nO_2$, $Pb_3O_4$, $PbO_2$, etc., and
(c) 400 parts total of inert filler, pigment and plasticizer.

To obtain a sealant composition in accordance with the invention, the base composition and the accelerator composition are mixed in the correct proportions to provide (1) 3 to 15 parts of polyfunctional amine for each 100 parts of dibrominated polybutadiene and (2) at least one mole of oxygen from the oxidizing agent for each mole of cure modifier, and preferably three or more moles of the oxygen from the oxidizing agent for each mole of cure modifier.

DESCRIPTION OF PREFERRED EMBODIMENTS

The following specific example is given to further illustrate the invention. In the example and elsewhere in this application, the "parts" are by weight unless otherwise stated.

EXAMPLE

| Base Component | |
|---|---|
| Dibrominated polybutadiene (Mol. Wt. Approx. 4400) | 70 |
| Low Mol. Wt. Butyl Rubber (Mol. Wt. 35,000 to 40,000) | 30 |
| Calcium Carbonate | 150 |
| Dialkyl Phthalate (Monsanto Santicizer 711) | 40 |
| Titanium Dioxide | 10 |
| Gamma-glycidoxy-propyltrimethoxy silane | 3 |
| Epoxy resin | 10 |
| Toluene | 10 |
| p-Quinone dioxime | 3 |
| Total | 326 |

| Accelerator Component | |
|---|---|
| Methylated pentaethylene hexamine | 12 |
| Manganese dioxide | 6 |
| Carbon black | 44 |
| Dialkyl Phthalate | 38 |
| Total | 100 |

10 Parts of the Base Component are mixed with one part of the Accelerator Component to obtain a pumpable sealant which cures in 72 hours at 77 degrees F. (room temperature). Typical properties of the cured adhesive on glass, aluminum and galvanized steel are:

| | |
|---|---|
| Shore A Hardness | 45 |

-continued

| | |
|---|---|
| Tensile Strength (ASTM D412) | 185 p.s.i. |
| Elongation (ASTM D412) | 300% |
| Peel Strength (SIGMA P7A) | 20 p.i.w. adhesive failure |
| Shear Adhesion (SIGMA P6A) | 200 p.s.i.- cohesive failure |
| MVT | 0.4g/100in.$^2$/24 hrs. |

We claim:

1. A pumpable, low viscosity, elastomeric, room temperature curable sealant composition, having good adhesion to glass, aluminum and steel, and providing a moisture barrier seal with good weather properties, said composition comprising (1) a blend of 5 to 95 parts of liquid dibrominated polybutadiene elastomer and 95 to 5 parts of liquid, low molecular weight butyl rubber and (2) a curing agent for each of the elastomers.

2. A sealant composition as in claim 1 wherein the polybutadiene elastomer has a molecular weight of 4,000 to 14,000, and the butyl rubber has a molecular weight of 35,000 to 45,000.

3. A sealant composition as in claim 2 wherein the curing agent for the polybutadiene elastomer is a poly tertiary amine and the curing agent for the butyl rubber is a mixture of an inorganic oxide oxidizing agent and an organic compound, which is convertible by oxidation to an aromatic dinitroso compound.

4. A sealant composition as in claim 3 wherein the poly tertiary amine is methylated pentaethylene hexamine, the inorganic oxide is manganese oxide, and the organic compound which is convertible to an aromatic dinitroso compound is p-quinone dioxime.

5. A pumpable, low viscosity, elastomeric, room temperature curable sealant composition, having good adhesion to glass, aluminum and steel, and providing a moisture barrier seal with good weathering properties, said composition comprising a mixture of:
 (A) a base composition consisting of:
  (a) 100 parts of a blend of 5 to 95 parts of dibrominated polybutadiene and 95 to 5 parts of low molecular weight butyl rubber,
  (b) 0 to 50 parts of an adhesion promoter,
  (c) 10 to 200 parts of fillers and pigments,
  (d) 0 to 100 parts of plasticizer,
  (e) 2 to 10 parts of heat stabilizer, and
  (f) 1 to 5 parts of a non-sulfur cure modifier which is oxidizable to an aromatic dinitroso compound, and
 (B) an accelerator composition consisting of
  (a) 100 parts of polyfunctional tertiary amine,
  (b) 10 to 50 parts of a solid inorganic oxide oxidizing agent, and
  (c) 400 parts of fillers, pigment and plasticizers
 and wherein the said mixture of (A) and (B) provides
  (1) 3 to 15 parts of polytertiary amine for each 100 parts of dibrominated polybutadiene and
  (2) at least one mole oxygen from oxidizing agent for each mole of cure modifier.

6. A sealant composition as in claim 5 wherein the polybutadiene elastomer has a molecular weight of 4,000 to 14,000, and the butyl rubber has a molecular weight of 35,000 to 45,000.

7. A sealant composition as in claim 6 wherein the polytertiary amine is methylated pentaethylene hexamine, the cure modifier is p-quinone dioxime, and the inorganic oxide is manganese dioxide.

8. A sealant composition as in claim 7 wherein at least two parts by weight of manganese oxide are used for each part by weight of p-quinone dioxime.

* * * * *